United States Patent [19]

Hiramatsu et al.

[11] Patent Number: 4,716,984
[45] Date of Patent: Jan. 5, 1988

[54] AUTOMOTIVE VEHICLE POWER TRAIN

[75] Inventors: Takefumi Hiramatsu; Noboru Ashikawa, both of Saitama, Japan

[73] Assignee: Honda Giken Kogyo Kabushiki Kaisha, Tokyo, Japan

[21] Appl. No.: 844,700

[22] Filed: Mar. 27, 1986

[30] Foreign Application Priority Data

Mar. 27, 1985 [JP] Japan .................................. 60-62351

[51] Int. Cl.⁴ ............................................... B60K 5/04
[52] U.S. Cl. ...................................... 180/297; 74/70; 123/195 HC
[58] Field of Search .................... 123/195 HC; 74/70; 180/297, 292, 291, 55, 76

[56] References Cited

U.S. PATENT DOCUMENTS

| | | | |
|---|---|---|---|
| 2,531,268 | 11/1950 | Herrington | 180/297 |
| 2,927,480 | 3/1960 | Schweickart | 180/76 |
| 4,431,079 | 2/1984 | Suzuki | 180/297 |

FOREIGN PATENT DOCUMENTS

| | | | |
|---|---|---|---|
| 1962539 | 6/1971 | Fed. Rep. of Germany | 180/55 |
| 864701 | 5/1941 | France | 180/291 |

Primary Examiner—John J. Love
Assistant Examiner—Eric Culbreth
Attorney, Agent, or Firm—Lyon & Lyon

[57] ABSTRACT

An automotive vehicle includes a body with an engine compartment. Its power train includes: an engine with a crank shaft and at least one cylinder, mounted within the engine compartment with the crank shaft extending transversely to the longitudinal direction of the vehicle body and with the cylinder extending generally horizontally; a transmission device with a power input shaft, coupled to the engine with the power input shaft substantially coaxial with and rotationally driven from the engine crank shaft; and a differential device, driven from the transmission device, with an axial center line which is located generally below the center line of the crank shaft. Thereby, the engine compartment arrangement can be made compact and low in height, and further the moments of inertia of the vehicle about its yaw and pitch axes can be kept low.

5 Claims, 4 Drawing Figures

AUTOMOTIVE VEHICLE POWER TRAIN

BACKGROUND OF THE INVENTION

The present invention relates to a power train for an automotive vehicle, and more particularly relates to a power train for an automotive vehicle, which is transversely mounted and has good compactness, as well as providing advantages relating to weight distribution.

In the design of an automotive vehicle, it is generally desired to minimize the exterior dimensions of the body thereof, while maintaining the desired dimensions for the interior of the passenger compartment. This is done in order to minimize utilization of materials and manufacturing cost, and in order to minimize weight and frontal area which is closely related to wind resistance, with the objective of reducing fuel consumption, and also in order to facilitate parking, storage and general drivability. In other words, for a given overall length of the external dimensions of the car body, it is desired to maximize the dimensions of the interior of the passenger compartment, which concomitantly entails minimizing the dimensions of the engine compartment. Further, in modern vehicle body designs, it is becoming more and more important to decrease the height of the engine compartment of the vehicle, with the aim of improving the streamlining characteristics of the shape of the vehicle body by lowering and sloping the hood line.

For example, in a typical prior art type configuration of a power unit in a front engine front wheel drive automotive vehicle (hereinafter referred to as a FF car), as particularly shown in FIG. 1 of the accompanying drawings which is a side view thereof, it is per se known to keep the dimension in the longitudinal direction of the engine compartment low by arranging the engine E transversely to the vehicle body. Further, it is per se known to maximize the length of the passenger compartment of the vehicle, within the limitation of keeping the overall vehicle length constant, by further minimizing the length of the engine compartments by placing a differential device D incorporated in the power train to the rear of the engine E so that the engine E overhangs to the front of the center A of the front axle of the vehicle.

However, this construction is not entirely satisfactory, because such overhanging of the engine E to the front of the center A of the vehicle front axle limits the wheel base of the vehicle to be shorter than it could otherwise be. Further, the center of gravity of the engine is, with regard to the longitudinal direction of the vehicle, in front of the front wheels, which tends to increase the moments of inertia of the vehicle about its yaw and pitch axes, and also deteriorates other dynamic properties of the vehicle such as its suspension characteristics.

SUMMARY OF THE INVENTION

Accordingly, it is the primary object of the present invention to provide a power train for an automotive vehicle, which avoids the above described problems.

It is a further object of the present invention to provide such a power train for an automotive vehicle, which allows the engine compartment of the vehicle to be made compact.

It is a further object of the present invention to provide such a power train for an automotive vehicle, which allows the engine compartment of the vehicle to be made longitudinally short.

It is a further object of the present invention to provide such a power train for an automotive vehicle, which allows the passenger compartment of the vehicle to be made as roomy as practicable.

It is a further object of the present invention to provide such a power train for an automotive vehicle, which allows the engine compartment of the vehicle to be made low in height.

It is a yet further object of the present invention to provide such a power train for an automotive vehicle, which improves weight distribution and general dynamic characteristics for the vehicle as a whole.

It is a yet further object of the present invention to provide such a power train for an automotive vehicle, which does not limit the vehicle wheel base.

According to the most general aspect of the present invention, these and other objects are accomplished by the description of a power train for an automotive vehicle comprising a body with an engine compartment, comprising: (a) an engine comprising a crank shaft and at least one cylinder, mounted within said engine compartment with said crank shaft extending transversely to the longitudinal direction of the vehicle body and with said cylinder extending generally horizontally; (b) a transmission device comprising a power input shaft, coupled to said engine with said power input shaft substantially coaxial with and rotationally driven from said engine crank shaft; and (c) a differential device, driven from said transmission device, with an axial center line which is located generally below the center line of said crank shaft.

According to the present invention as described above, since the path of power transmission from the transmission device to the differential device is arranged generally vertically, the center of gravity of the power train as a whole including the engine can be brought to be generally above and close to the central axis of the driven wheels of the vehicle, i.e. the driven axle, and thereby engine overhang is minimized while vehicle wheel base is maximized. Accordingly, the length of the engine compartment is minimized, thus allowing the length and roominess of the vehicle passenger compartment to be maximized while maintaining a set vehicle length. Also, the moments of inertia of the vehicle as a whole about its yaw and pitch axes are minimized, which results in various advantages with regard to vehicle handling and performance.

Furthermore, because of the fact that the cylinder or cylinders of the engine are arranged as generally horizontal, it becomes possible to very much lower the vehicle hood line, which has beneficial advantages with regard to improvement of vehicle streamlining, particularly in the case of a FF vehicle. Also, since it becomes practicable to locate a carburetor, an ignition system, and other frequently serviced subassemblies on top of the cylinders of the engine and thus in an easily accessible position for maintenance, the servicability of the vehicle is greatly enhanced by a layout according to the present invention.

BRIEF DESCRIPTION OF THE DRAWINGS

The present invention will now be shown and described with regard to the preferred embodiment thereof, and with reference to the illustrative drawings, in which.

DESCRIPTION OF THE PREFERRED EMBODIMENT

Figure 1:
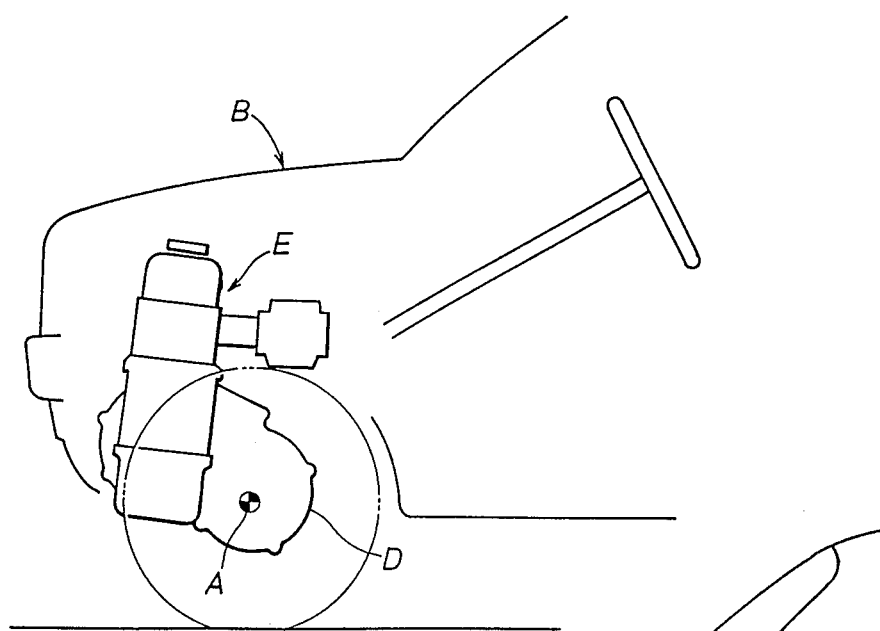
FIG. 1 is a side view of the engine compartment of a vehicle equipped with a conventional transversely mounted power train.
Figure 2:
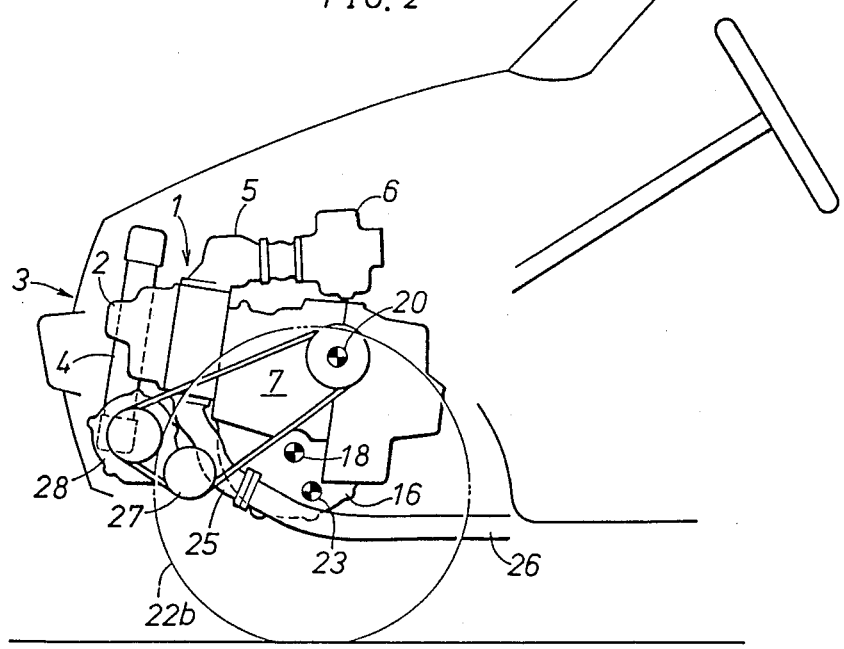
FIG. 2 is a side view of the engine compartment of a vehicle equipped with a transversely mounted power train according to the preferred embodiment of the present invention.
Figure 3:
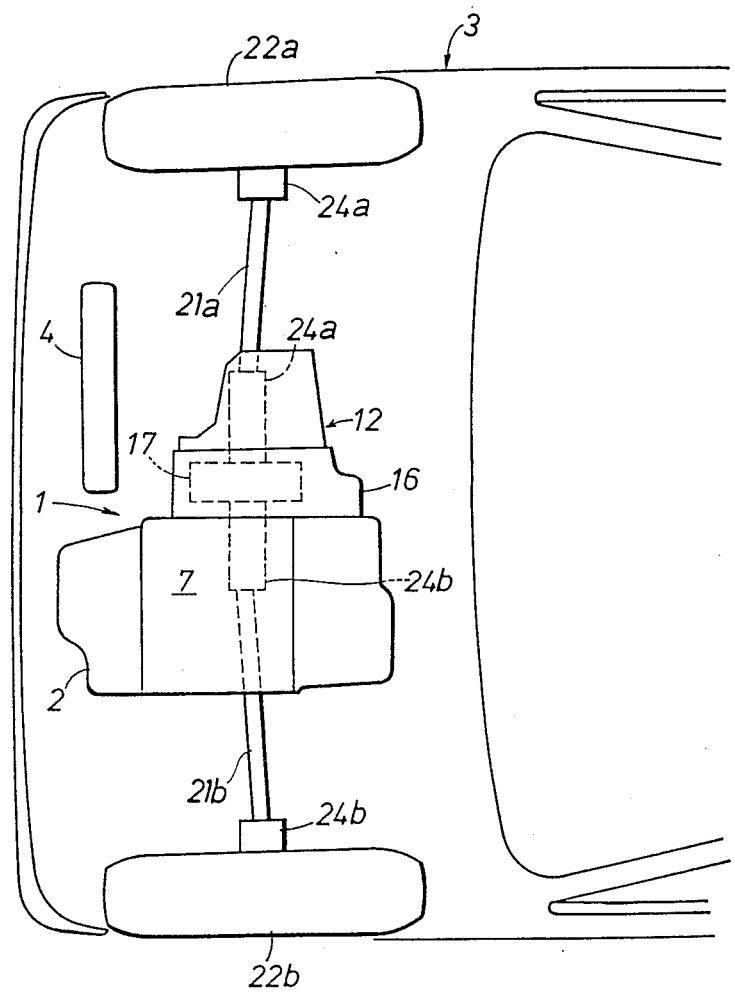
FIG. 3 is a plan view of the engine compartment including said preferred embodiment power train.
Figure 4:
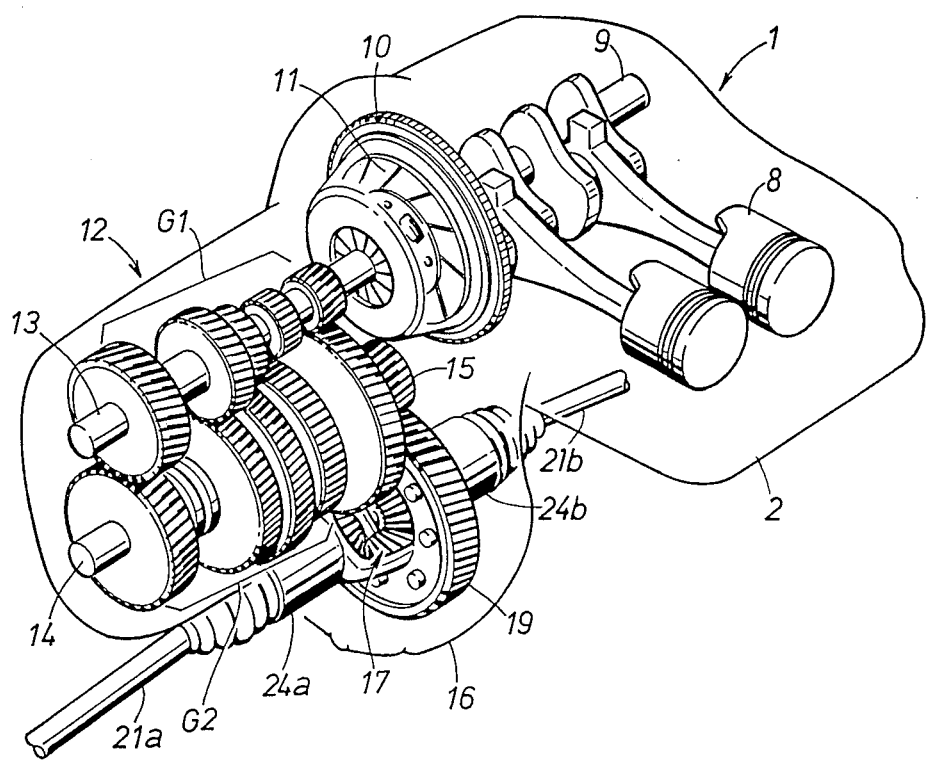
FIG. 4 is a schematic perspective view of main parts of the preferred embodiment power train as seen from the upper left side of FIG. 3.

In FIGS. 2, 3 and 4, the reference numeral 1 denotes an internal combustion engine, which has a cylinder head 2, two in line cylinders provided in a cylinder block 7 and equipped with pistons 8, a crank shaft 9, and a flywheel 10. This engine 1 is transversely mounted in the body 3 of a vehicle with its two parallel in line cylinders lying in a generally horizontal plane; the cylinder head 2 of the engine 1 is disposed towards the front of the vehicle. As best shown in FIG. 3, the engine 1 is displaced towards the left side of the vehicle body 3 from the longitudinal center line thereof, in order to accommodate a radiator 4 towards the right side of said vehicle body 3. And an intake manifold 5 and a carburetor 6 are mounted on the upper side of said engine cylinder head 2, so as to be easily available for the frequent servicing inevitably required for such units.

The reciprocating motion of the pistons 8 is converted into rotational motion of the crank shaft 9, and this motion, via the flywheel 10 secured to the end of said crank shaft 9 and via a friction plate 11 of a friction clutch assembly, rotationally drives the main shaft 13 of a transmission device 12 mounted on the side of the engine 1; thus said main shaft 13 functions as the rotational power input shaft of said transmission device 12, and said transmission device 12 is connected to said engine 1 with its rotational power input member 13 substantially coaxial with the crank shaft 9 of said engine 1.

In said transmission device 12, a counter shaft or lay shaft 14 is provided generally parallel to and below the main shaft 13. A plurality of gear wheels G1 provided on the main shaft 13, and a plurality of gear wheels G2 on the lay shaft 14, are mutually and selectably mesh in a per se conventional manner according to the shift position of a shift lever which is not shown in the drawings, so as to provide any desired one of a plurality of transmission ratios. And rotational power is taken out from the transmission device 12 via a power output gear wheel 15 fixed to the end of the lay shaft 14.

This rotational power is supplied to a final drive or input gear wheel 19 of a per se conventional differential device 17, the casing 15 of which is integrally formed with the casing of the transmission device 12. The differential device 17 is coaxially received within the input gear wheel 19, and its axial center line 18 (see FIG. 2) is located below the cylinder block 7, slightly to the forward direction from the axial center line 20 of the crank shaft 9.

A right side power output shaft of the differential device 17 is coupled to and drives a right vehicle wheel 22a via a universal joint 24a, a drive shaft 21a, and another universal joint 24a; and, similarly, a left side power output shaft of the differential device 17 is coupled to and drives a left vehicle wheel 22b via another universal joint 24b, another drive shaft 21b, and another universal joint 24b. These universal joints 24a and 24b are constant velocity joints. As shown in FIG. 2, the front axle line 23, which joins the centers of the right and left wheels 22a and 22b when the vehicle steering is pointing straight ahead, lies below the axial center line 20 of the crank shaft 9, and, with respect to the longitudinal direction of the vehicle, generally between said axial center line 20 of the crank shaft 9 and the axial center line 18 of the differential device 17.

Thus, because with respect to the longitudinal direction of the vehicle the axial center line 20 of the crank shaft 9 lies somewhat behind the front axle line 23, the center of gravity of the combination of the engine 1 and the transmission device 12 lies adjacent to said front axle line 23. Since the total weight of said engine 1 and said transmission device 12 is much greater than the weight of the differential device 17, this is extremely effective for reducing the moments of inertia of the vehicle as a whole about its yaw and pitch axes.

As shown in FIG. 2, an exhaust manifold 25 is connected to the lower side of the cylinder head 2, and, after passing under one of the drive shafts 21a or 21b, is connected to an exhaust pipe 26 which leads to an opening at the rear of the vehicle. This arrangement is facilitated because of the presence of a space in front of the casing 16 of the differential device 17. This space also, advantageously, accomodates various other accessory equipment such as an alternator 27, an air conditioning compressor 28, and so on.

Although the shown preferred embodiment of the present invention is an application thereof to an FF type configuration vehicle, the present invention is not to be considered as limited thereto; in fact, the present invention can also be applied to a RR configuration type vehicle (a rear engine rear wheel drive vehicle), to a midship engined vehicle, and the like.

Thus, according to the concept of the present invention as described above with respect to its preferred embodiment, since the path of power transmission from the transmission device 12 to the differential device 17 is arranged generally vertically, the center of gravity of the power train as a whole including the engine 1 can be brought to be generally above and close to the central axis 23 of the driven wheels of the vehicle, i.e. to the driven axle, and thereby engine overhang is minimized while vehicle wheel base is maximized. Accordingly, the length of the engine compartment is minimized, thus allowing the length and roominess of the vehicle passenger compartment to be maximized while maintaining a set vehicle length. Furthermore, because of the fact that the cylinders and pistons 8 of the engine are arranged as generally horizontal, it becomes possible very much to lower the vehicle hood line, which has beneficial advantages with regard to improvement of vehicle streamlining, particularly in the shown case of a FF vehicle. Also, since it becomes practical to locate the carburetor 6, the engine ignition system (not particularly shown), and other frequently serviced subassemblies on top of the cylinders of the engine 1 and thus in an easily accessible position for maintenance, the servicability of the vehicle as a whole is greatly enhanced by a layout according to the present invention.

Although the present invention has been shown and described in terms of the preferred embodiment thereof, it should not be considered as being particularly limited thereby. The details of any particular embodiment, or of the drawings, could be varied without departing from the spirit of the present invention. Accordingly, the scope of the present invention is to be considered as being delimited, not by any particular perhaps entirely fortuitous details of the disclosed preferred embodiment but solely by the scope of the accompanying claims, which follow.

What is claimed is:

1. A power train for an automotive vehicle comprising a body with an engine compartment, comprising:
    (a) an engine comprising a crank shaft and at least one cylinder, mounted within said engine compartment with said crank shaft extending transversely to the longitudinal direction of the vehicle body and with said cylinder extending generally horizontally;
    (b) a transmission device comprising a power input shaft, coupled to said engine with said power input shaft coaxially with and rotationally driven from said engine crank shaft;
    (c) a differential device, driven from said transmission device, with an axial center line which is located generally below the center line of said crank shaft, and
    (d) said vehicle having two wheels driven from said differential device and arranged on a driven axle means, wherein, in the longitudinal direction of the vehicle, the axis of the two driven wheels is located generally between said center line of said crank shaft and said axial center line of said differential device.

2. A power train for an automotive vehicle according to claim 1, wherein said differential device includes two power output shafts coaxial with one another and with said axial center line of said differential device, and said driven axle means includes two laterally extending axles connected to said two power output shafts.

3. A power train for an automotive vehicle according to claim 1, further comprising a carburetor mounted to said engine generally above said cylinder thereof.

4. A power train for an automotive vehicle according to claim 1, wherein the engine compartment is at the front of the vehicle, the center line of the crank shaft is to the rear of the wheel axis, and the axial center line of the differential device is in front of the wheel axis.

5. A power train for an automotive vehicle according to claim 4, wherein the center line of the differential device is above the wheel axis and the center line of the crank shaft is above the center line of the differential device.

* * * * *